Jan. 21, 1969 J. W. PAN 3,423,534

TRANSMISSION OF SUPERVISORY INFORMATION

Filed Nov. 21, 1963 Sheet 1 of 6

INVENTOR
J. W. PAN
BY G. E. Kersey
ATTORNEY

Jan. 21, 1969 J. W. PAN 3,423,534

TRANSMISSION OF SUPERVISORY INFORMATION

Filed Nov. 21, 1963 Sheet 4 of 6

United States Patent Office 3,423,534
Patented Jan. 21, 1969

3,423,534
TRANSMISSION OF SUPERVISORY INFORMATION

John W. Pan, Plainfield, N.J., assignor to Bell Telephone Laboratories, Incorporated, New York, N.Y., a corporation of New York Filed Nov. 21, 1963, Ser. No. 325,273
U.S. Cl. 179—15 25 Claims
Int. Cl. H04j *1/14*

This invention relates to the transmission of supervisory information and more particularly to the sub-carrier transmission of such information.

Supervisory information is required to carry out the various control operations that attend message transmission. Such control operations embrace numerous categories, of which one of the most important is designated "synchronization." Synchronization is of particular importance in pulse code modulation where message information is transmitted by groups of pulse signals.

At the level of individual pulses, synchronization entails their establishment at a uniform rate, i.e., the number per interval should be substantially the same throughout a system. Otherwise, it is difficult to "time" the signals on reception, even those of a single channel, to say nothing of the difficulties posed by attempting to merge signals of different channels. Each interval may be likened to a "frame" and this kind of synchronization is designated rate framing.

Rate framing is not easily attained. Seldom are the oscillators of a system stabilized to better than one part in a million, which means that their frequencies are off by one cycle out of every million. Although the departure is small percentagewise, it has serious consequences where pulse code signals are generated at megabit rates, i.e., several million per second.

Under such circumstances, synchronization is customarily achieved by adding an occasional, supernumerary signal to those being generated. Of course, each added signal must be removed on reception to prevent interference with the message. For that purpose, supervisory information serves to indicate which of the transmitted signals have been inserted as supernumeraries.

At another level of synchronization, the signals must be identified by channel. Such is the case where signals from a multiplicity of sources are combined, i.e., multiplexed, to share the same carrier. Hence it is necessary to provide a second kind of synchronization designated multiplex framing. The designation stems from the fact that the signals are, in effect, fitted or "framed" into multiplexes of recurrent time-slot intervals.

Finally, the message signals on any particular channel must be grouped on reception in the same way that they were created at the time of transmission. Otherwise the decoded message will contain unintelligible information derived from portions of adjoining code words. This third kind of synchronization is often called group framing.

Typically the required supervisory information is transmitted by a separate channel. Or it is interspersed among the items of information transmitted by the individual channels. In either case there is an attendant reduction in system capacity. Where a separate channel is employed, there is a reduction in the number of channels that could otherwise be devoted to message information. Where the supervisory information is interspersed, the rate of message transmission is correspondingly decreased. Accordingly it is an object of the invention to expedite the transmission of supervisory information. A related object is to do so without the detriment to the message channel capacity that accompanies the use of auxiliary signals and channels. A still further object is to eliminate the need for auxiliary channels and signals in the transmission of supervisory information.

To accomplish the foregoing and related objects the invention provides for selectively replacing "pre-assigned" message signals with "reserved" signals under the control of supervisory information. The reserved signals are either precluded from initially appearing in a message wave, or if they do appear initially, they are immediately excluded, typically by being converted into permissible message signals. Subsequently, reserved signals are selectively substituted for preassigned signals in the message wave. Hence, the reserved and preassigned signals, taken together, constitute a subcarrier of supervisory information. When there are two supervisory conditions, one of them is indicated by substituting a reserved signal for a preassigned signal. The other condition is indicated by transmitting a preassigned signal in its original form. The term subcarrier is used in the sense that preassigned message signals are manipulated in a way that permits the transmission of supervisory information, while, at the same time, allowing ultimate recovery of the message information associated with the preassigned signals.

An illustrative embodiment of the invention employs conventional five-bit binary coding. In such coding, there are thirty-two possible code words, each made up of five binary digits. One of the thirty-two possible code words is reserved and designated R. It does not initially appear at the output of a message source, or if it does, it is immediately converted to another form. Another of the possible code words is preassigned and designated P. The resulting reserved and preassigned code words R and P constitute a subcarrier. Whenever a preassigned code appears in a message, it is transmitted as it appears, or it is converted into an R code, depending upon whether the supervisory signal is a binary 1 or a binary 0. Since an R code is reserved, either by being precluded or by being initially excluded from the message codes, it desirably occurs infrequently in a message. Such a code is the all 1's code that is at the end of the conventional binary coding range. For a conventional five-bit system the reserved, all 1's code is $R=11111$.

On the other hand, a preassigned code is one which occurs often, such as the code $P=01111$ lying near the middle of the conventional binary coding range. When the R and P codes are selected in this way, the frequent occurrences of the P codes provide an appreciable subcarrier capacity, while the small likelihood of an R code means that its preclusion has a negligible effect on reducing the message capacity of the transmission system.

In the illustrative embodiment being presently considered, message code groups to be transmitted are continually monitored for the presence of the preassigned codes, each in the form $P=01111$. Whenever a preassigned code is sensed, supervisory information is inserted into the transmitted pulse train. If the supervisory information is a binary 1, the preassigned code is converted by inverting its first digit, which is a 0, into a 1. The result is the reserved code $R=11111$. If the supervisory information is a binary 0, the preassigned code is transmitted in its oriignal form.

On reception, the supervisory information is extracted and the reserved codes, as they occur, are replaced by pressassigned codes to restore the message to its original form. Continuing the example of a five-bit system, a code recognizer senses the receipt of a code group having an all 1's stem, 1111, i.e., a code group with four consecutive 1's out of five digits. In the context of the invention, a stem is a subgroup of consecutive digits, less in number than the digits of a code group. Codes with an all 1's stem are either those that are reserved—$R=11111$, or those that are preassigned—$P=01111$. If the received code is one of those that has been preassigned, the supervisory signal being transmitted is a binary zero and the message train is unaffected. If a reserved code $R=11111$ is received, the supervisory signal is a binary 1 and the reserved code is converted to its preassigned code counterpart simply by converting the first, i.e., left-most, digit.

In other embodiments of the invention, the subcarrier R and P codes are employed in conjunction with supernumerary pulse signals to achieve rate synchronization of a pulse code system. A supernumerary pulse signal is an "extra" that is inserted into a train of message pulses. If 100 message pulses of one channel are generated in one part of a system, but only 99 are generated during the same interval in another part of the system for another channel, the supplementation of the signals in the second channel by an "extra" or supernumerary pulse signal makes the complement of pulses the same throughout the system and achieves rate synchronization.

The location of the supernumerary pulse signal is readily specified by employing the subcarrier technique of the invention. When it becomes necessary to insert a supernumerary pulse signal, the message codes are monitored until a preassigned code P is detected. Then the P code is replaced by a reserved code R and immediately followed by an "extra" pulse. When the reserved code is detected, the receiver is made to skip a pulse—thus deleting the extra pulse that was included for the purpose of rate synchronization. The receiver also replaces the detected R code with a P code, thus restoring the message to its original form.

Of course, errors in transmission may change a P or R code into a message code or may convert a message code into a P or R code. In either event it is difficult to locate an inserted supernumerary pulse signal. To provide more positive identification of the location of the supernumerary pulse signal, the invention employs redundancy. For example three P codes are detected and converted to R codes before a supernumerary pulse signal is inserted. Then a single conversion of a message code to an R code is not mistaken as identifying the location of a supernumerary pulse signal. And even if one of the three specified R codes is in error, the receipt of two successive such codes indicates that there is a supernumerary pulse signal in their vicinity. Hence the receiver is arranged to respond to the next P or R code that appears by dropping a pulse signal. This restores the pulse train to its original condition, and although there will be errors in the code groups that occur between the actual location of the supernumerary signal in the pulse train and the point at which a pulse signal is dropped in response to the detection of either a P or an R code, the number of such errors is inconsequential in a relatively high speed pulse system.

In accordance wtih another feature of the invention group synchronization is accomplished, as well as rate synchronization, by transmitting P codes in place of the R codes. In that event, the P codes, which normally have a high likelihood of occurrence, will appear infrequently, being transmitted only when supernumerary pulse signals are to be added to a pulse train for rate synchronization. Consequently, rate synchronization takes place in a fashion similar to that described above, but, in addition, an abnormal incidence of the P codes will indicate a failure of group framing.

More generally the invention provides for reserving a subset of $n$ message codes out of a set of $m$ message codes. For each reserved code $R_1$ through $R_n$ there is a preassigned code $P_1$ through $P_n$ of the resultant set $m-n$. In effect, the result is subcarrier code pairs $R_iP_i$, where the subscript $i$ designates a generalized member of the subset $n$. It is to be understood that only one member of a subcarrier code pair is transmitted at a time. In the case of binary information of supervisory 1 is transmitted by replacing each occurrence of a preassigned code $P_i$ in the message by a precluded code $R_i$. For a binary 0 the preassigned code $P_i$ is transmitted without change. The channel capacity for each subcarrier is the average rate of occurrence of each preassigned code $P_i$ in the message.

It is a general feature of the invention that several channel pairs may be employed concurrently to increase the information rate.

It is another general feature of the invention that the precluded signals, and the message signals with which they are associated, can be selected in a way that provides an appreciable signaling capacity while simultaneously reducing the possibility of error.

Still another feature of the invention is the multiple synchronization of pulse modulation system by which rate, group, and multiplex framing are accomplished.

Other features of the invention will become apparent after a consideration of several illustrative embodiments taken with the drawings in which.

Figure 1A:
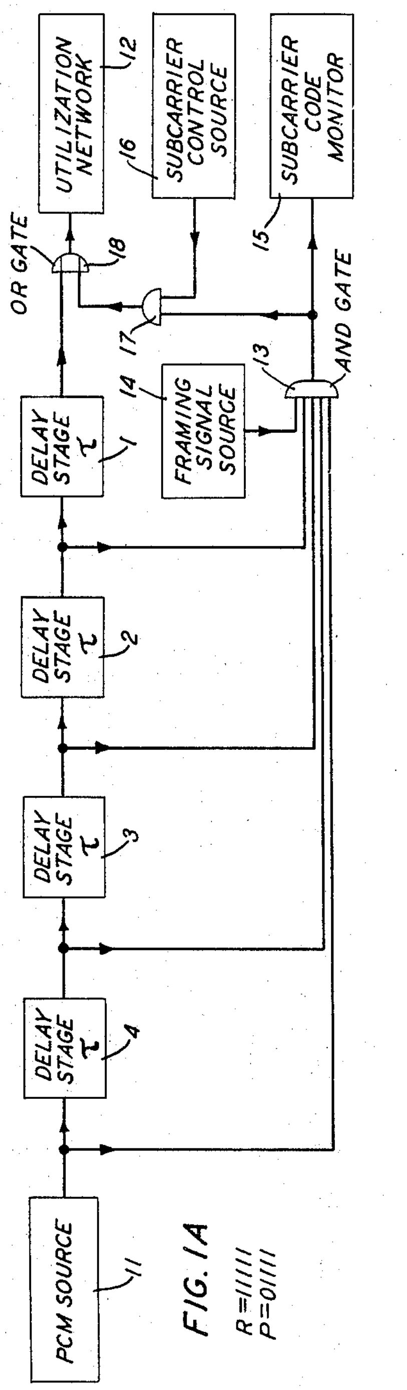
FIGS. 1A and 1B are respective block diagrams of a subcarrier transmitter and of a subcarrier receiver in accordance with the invention.

With reference to the subcarrier transmitter of FIG. 1A, a train of pulse code modulation signals from a message source 11, and intended for a utilization network 12, is applied to a plurality of delay stages 1 through 4 in which a preassigned group of code signals is replaced, whenever the group occurs, by a reserved group of code signals. The delay stages, which may be tapped sections of an ordinary delay line, each being provided the same preassigned delay $\tau$. The delay $\tau$ is the time interval between successive digit signals.

For simplicity of exposition, the subcarrier transmitter of FIG. 1A is adapted for operation with conventional binary code words of five digits each. Since the code is binary, each digit is either a 1 or a 0. Signalwise, a 1 is representable by a positive pulse and a 0 is representable by the absence of a pulse. Of course, any of the other well known signaling conventions for binary codes may be employed. For example, a 1 may be represented by a positive pulse and a 0 by a negative pulse.

The five-digit reserved code R is the all 1's code 11111. It is paired with a preassigned code $P=01111$. The all 1's code is at the extreme end of the conventional binary range so that it is easily precluded from the message codes. Thus, where the codes are generated with a code mask in an encoder of the message source 11, the reserved code R is precluded by terminating the mask short of its full extent. Alternatively, the reserved code R can be precluded by using a limiter at the input of an analog-to-digital converter in the source 11.

The preassigned code $P=01111$, with which the reserved code $R=11111$ is paired, is advantageously selected from the middle of the coding range. Hence it has a high likelihood of occurrence on a random signal basis and provides the subcarrier with a large informational capacity. Further, conversion from the reserved code to an associated preassigned code is relatively simple, entailing the binary inversion of the first digit. This inversion converts a 1 to a 0. In signal terms, for example, it converts a pulse to no pulse or a positive pulse to a negative pulse, depending upon the signaling convention adopted for the binary code.

For the designated preassigned code $P=01111$ and the reserved code $R=11111$ there is an additional advantage. Either one is readily detected. Both the preassigned and reserved codes contain the same "stem," i.e., they have the same digits extending from the second position to the last position, namely a sequence of binary 1's. Hence the first, i.e., left-most digit of either a preassigned code or a reserved code contains the subcarrier information. The first digit of the preassigned code is a 0, while the first digit of the reserved code is a 1.

In FIG. 1A, the components have been arranged for the convention that the binary signals are transmitted in the order of significance, starting with the first digit of each code word. Hence, the occurrence of four successive pulse signals representing 1's at an AND gate 13 indicates the probable presence of a preassigned code $P=01111$, the reserved code R=11111 having been precluded. Positive identification of the preassigned code is made by an enablement signal at the AND gate 13 from a "group" framing source 14. Enabling signals from the framing source 14 occur repetitively following each group of five pulse intervals associated with a code word. The detected presence of a preassigned code is indicated by a monitor 15.

If a supervisory 1 is to be transmitted, a signal from a subcarrier source 16 is applied to one terminal of a second AND gate 17. Simultaneously the other terminal of the AND gate 17 is enabled from the first AND gate 13 to produce the desired output at an OR gate 18.

As a result of a detected preassigned code and a supervisory 1 at the control source 16, the output of the delay stages consists of the all 1's reserved code, which is normally precluded from the message information but is being transmitted at the dictate of the control source 16.

Figure 1B:
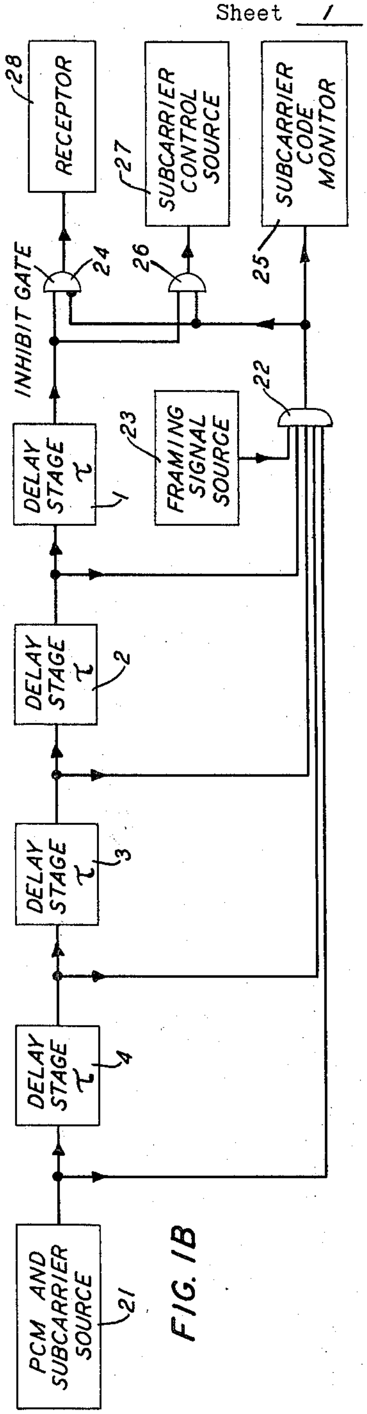

At the subcarrier receiver, shown in FIG. 1B, the signals from a source 21, such as the subcarrier transmitter of FIG. 1A, enter a series of delay stages similar to those at the transmitter. As before, the variously delayed pulse signals of the train are applied to an AND gate 22. When four pulse signals representing 1's appear at the terminals of the AND gate 22, as well as an enabling signal from a framing source 23, an output is produced which inhibits the output of the pulse stages at an inhibit gate 24 for one digit interval. The framing source 23 performs a function similar to that of the framing source 14 of FIG. 1A, except that it is a part of a subcarrier receiver rather than a subcarrier transmitter. If the first of the delay stages contains a 1 while the gate 24 is being inhibited, as it would if a reserved word were being transmitted, the latter is converted to a 0.

The detected presence of a reserved code word is signified by a monitor 25 that is activated from the AND gate 22. The latter also enables one terminal of an AND gate 26, whose other terminal responds to the first delay stage 1, so that the output at a control source 27 is the subcarrier signal, while the output of the inhibit gate 24 to the receptor 28 is the desired message signal.

The subcarrier transmitter in FIG. 1A has various employments. One such employment achieves the rate framing of code signals by supplementing them, from time to time, with auxiliary, supernumerary signals. The supplementation, when required, takes place after the detection of a preassigned code P and its replacement by a reserved code R. Each replacement code R serves to locate a supernumerary signal. The code signals of various channels, as thus supplemented by supernumerary signals, are multiplexed at a transmitting station.

A representative channel carrying digit and supernumerary signals has the pulse sequence —*xxxxx*01111*xxxx*—*xxxxx*01111
*xxxxxxxxxx*11111*sxxxxx*— where message pulse signals are designated by *x*'s and the supernumerary signal is designated by an *s*. In the case of a single error in a reserved code group $R=11111$, the supernumerary pulse signal will not be removed at the proper time.

As shown in the representative pulse sequence of the preceding paragraph, the supernumerary pulse signal immediately follows the all 1's reserved code group. Consequently, a single error in the reserved code group will cause one of the 1's to be replaced by a 0. If the 0 attributable to error is in the first, i.e., most significant, digit position, the stem of the code group will be properly detected, but the fact of a 0 in the most significant digit position will indicate the apparent detection of a preassigned code group, and the supernumerary pulse will not be removed. If the 0 attributable to error is in some other digit position of the reserved code group, there will be no detection of the stem at all, and, again, the supernumerary pulse will be passed. Any failure to remove a supernumerary pulse on reception will interfere with decoding. As a consequence the pulse train to be decoded is accompanied by a non-message pulse signal. When the individual signals of the train are grouped into assemblages of five bits each, one of the groups will contain the non-message pulse and all of the other succeeding groups will be misgrouped by one pulse position. Even so, the interference with decoding is only temporary. Ultimately a subsequent error will convert a message to a reserved code, and the supenumerary pulse signal is removed at that time. Although the pulse signal thus removed is not the supernumerary pulse signal originally inserted into the train, the result, nonetheless, is to bring the sequence of pulses back into frame.

For more rapid framing, an error correction technique is employed, as by using three reserved code goups to precede the supernumerary pulse signal being inserted into the pulse train. With this arrangement single errors causing a message code to be converted can be ignored. And, if one of the three reserved codes is converted into a message code, the supernumerary pulse signal will be known to be in the vicinity of the two remaining, unconverted codes. This knowledge is attributable to the way in which the error correction has been organized, using three reserved codes to precede the supernumeray signal. When two consecutive reserved codes are received, the receiver is on notice that a third reserved code is to be expected in due course. If the third reserved code does not materialize within the likelihood of a P code interval, this indicates the probable conversion of one of the R codes into a message code. Thereafter, an R code will not recur until the ensuing introduction of a supernumerary pulse signal. However, the P codes will continue to occur at their relatively high rate, based upon their selection near the middle of the coding range. Hence the receiver is organized to delete a pulse signal immediately following the first subcarrier code, either precluded or preassigned, which follows two precluded codes. Because of the relatively high occurrence rate of the P codes, the sequence of pulse signals is rapidly brought back into frame.

It is to be noted even with no special provision for framing, a receiver which is supplied with precluded code signals in accordance with the invention is nonetheless able to maintain correct framing. This is particularly the case where the precluded code signals are used in systems with the kind of stabilized oscillator commonly employed in pulse code modulation. Typically a supernumerary pulse signal is required only once for every several hundred appearances of the subcarrier codes. Consequently, if the precluded code signals are detected with a substantial incidence, this indicates an out-of-frame condition and appropriate correction is undertaken.

To further demonstrate the invention, the subcarrier transmitter and receiver principles discussed in conjunction with FIGS. 1A and 1B are extended to an illustrative pulse code modulation system presented in FIGS. 2A through 4.

Figure 2A:
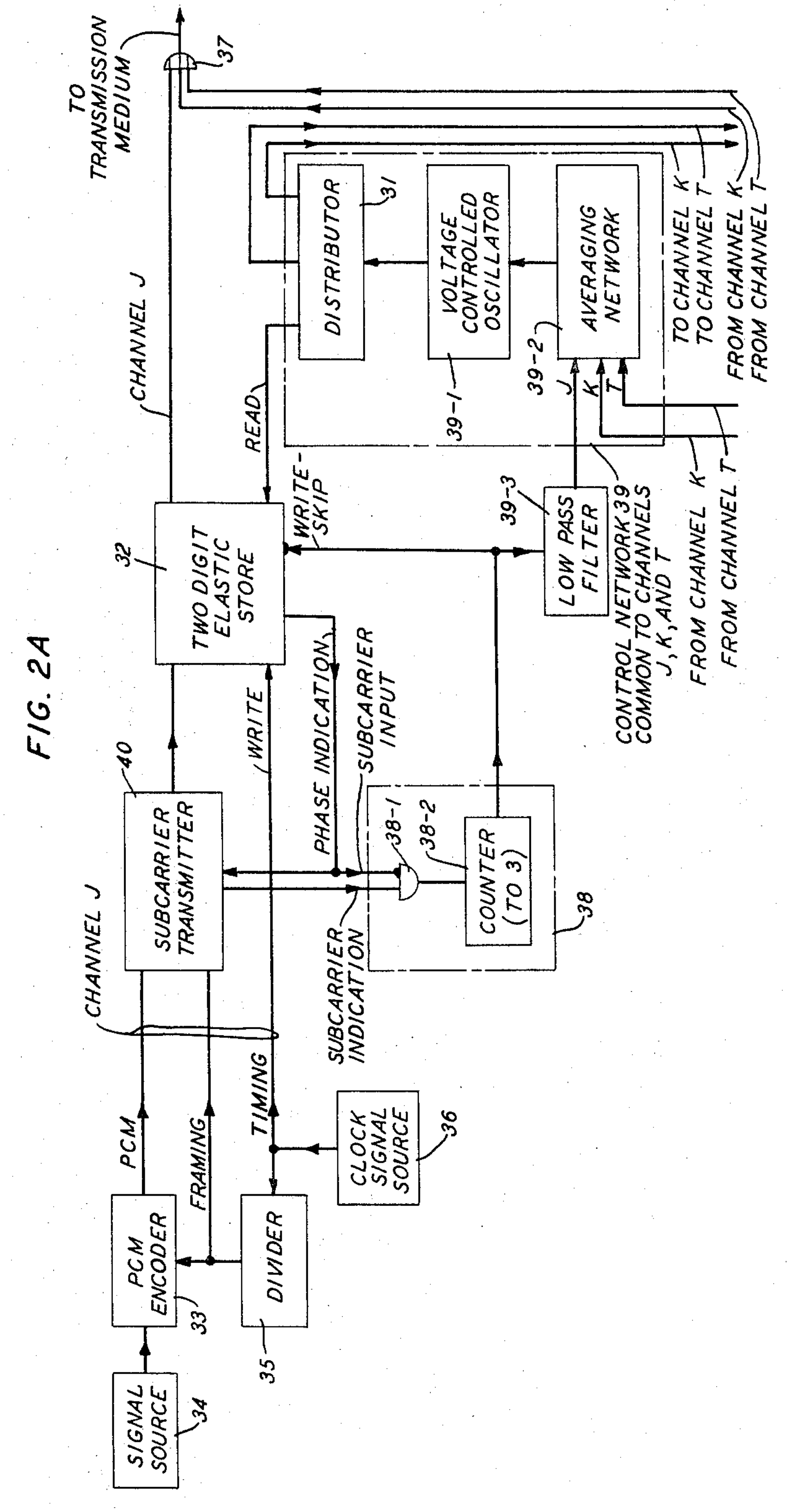
FIG. 2A is a block diagram of a transmitting station for a multiplex system employing a subcarrier transmitter.

At the transmitter station of FIG. 2A the signals of two voice channels, designated J and K, and one television channel, designated T, are multiplexed on a digit by digit basis by a distributor 31 of standard design. The distributor 31 is a switch that connects an output OR gate 37 to channels J. K and T in succession by the action of a control network 39 that is common to all channels. The remaining components at the transmitter station are similar for all channels and are shown for only one, channel J.

Each channel includes a subcarrier transmitter 40, based upon the similar transmitter of FIG. 1A. Signals applied to the subcarrier transmitter 40 are taken from the output of a nine-bit PCM encoder 33, operating at a 6 megabit rate for voice channel J. There is a similar encoder for channel K. However, since channel T is for video, its corresponding encoder operates at a 12 megabit rate. Inputs to the encoder 33 include the output of a voice signal source 34 and a framing signal obtained from a divider 35 that is driven by a clock signal source 36. The clock signal source contains an independent oscillator (not shown), the stability of which, for example, is one cycle in a million.

Consequently, the multiplex signals at the output OR gate 37 take the form —*jtktjtk*— where *j* is a bit signal from channel J, *t* is a bit signal from channel T, and *k* is a bit signal from channel K.

Four pairs of subcarrier codes are assigned to each channel. The R code group 1111111*xx* is employed for all channels, where *x* is either 0 or 1, to account for four possible combinations. For the P codes, the permitted combinations are 1010101*xx*, 0101010*xx*, and 0100101*xx* for channels J, K and T respectively. An additional code 1011010*xx* is reserved for an additional channel L to be discussed shortly.

In the discussion following FIGS. 1A and 1B, P codes were detected and replaced by R codes whenever supernumerary signals were to be added to a pulse train. Since only an occasional supernumerary pulse is required, the P codes are only occasionally replaced. While suitable for rate framing this procedure is modified in FIG. 2A in order to achieve group framing as well.

Instead of replacing the P codes by R codes when supernumerary signals are to be added, the procedure is reversed. Each time a supernumerary pulse signal is to be added to the pulse train, a P code is detected and transmitted without change. Otherwise each detected P code is transformed into an R code. Again, only an occasional supernumerary pulse will be required. Hence the P codes will appear infrequently. But the P codes have been selected from near the middle of the coding range. As a result, the P codes will occur infrequently only if pulse signals are being properly grouped. Otherwise, namely when the pulse signals are being misgrouped, there is the same likelihood of detecting a P code as when P codes are transmitted without being replaced by R codes. This circumstance allows a ready determination of whether or not the system is in frame on a group basis, a high incidence of P codes indicating an out-of-frame condition.

To summarize the subcarrier procedure adopted for the transmitter station of FIG. 2A, the R codes are normally transmitted in place of the P codes except when supernumerary pulse signals are to be inserted. In the latter event, P codes detected by the subcarrier transmitter 40 are transmitted without alteration and after three such codes, a supernumerary control network 38 acts upon an elastic store to cause the insertion of a supernumerary pulse signal. The elastic store is discussed more fully below.

Figure 2B:
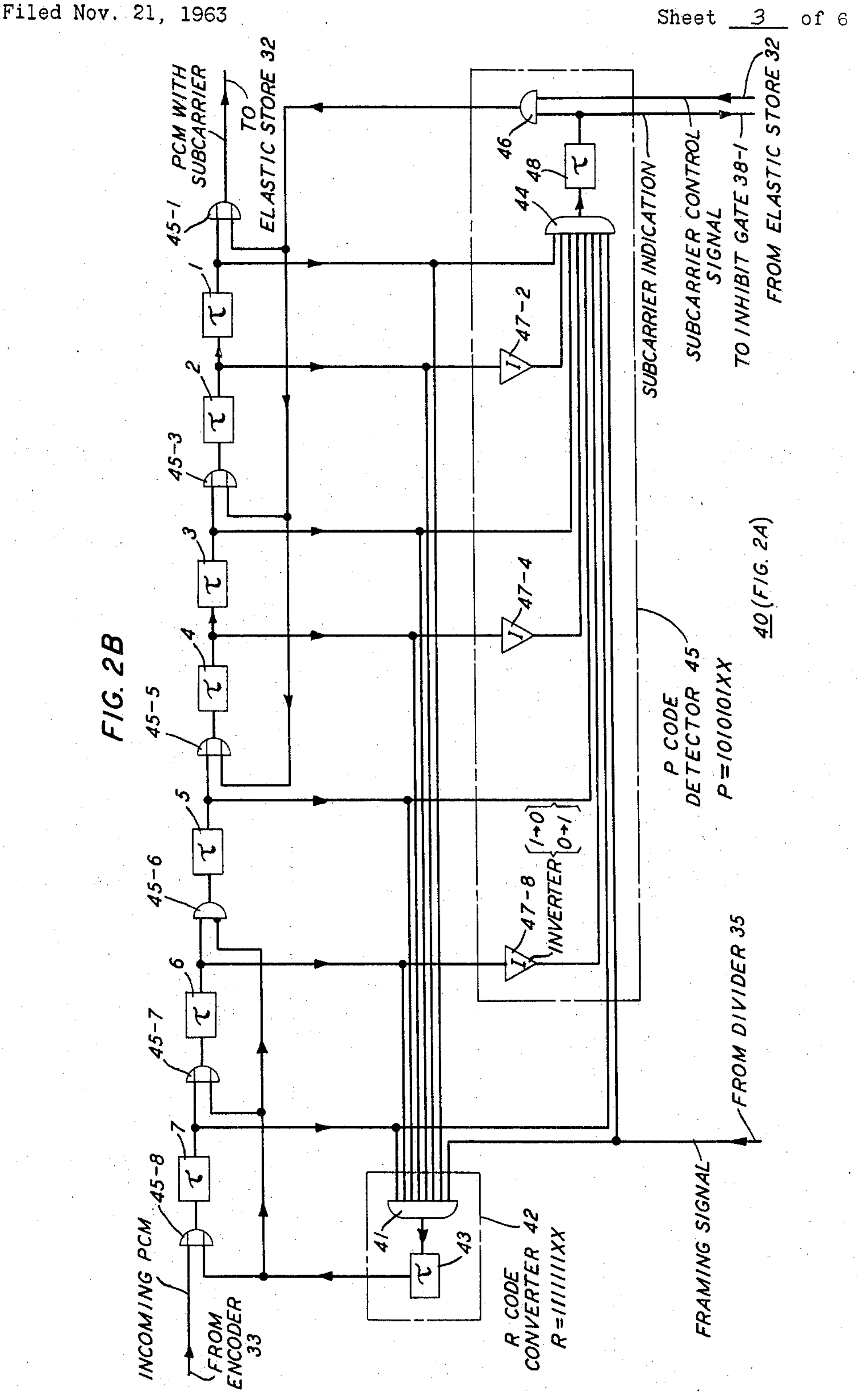
FIG. 2B is a block diagram of a subcarrier transmitter for the station of FIG. 2A.

Turning momentarily to the subcarrier transmitter 40, as detailed in FIG. 2B, a tapped delay line constituted of seven delay stages 1 through 7 is used to apply the seven most significant digit signals of each incoming code word simultaneously to an R code converter 42 and a P code detector 45. The delay stages 1 through 7 are similar to the delay stages 1 through 4 of FIG. 1A, except for the addition of delay stages 5 through 7 to account for the fact that the stem of each code word contains seven digits for the subcarrier transmitter of FIG. 2A, rather than four digits as for the subcarrier transmitter of FIG. 1A.

Since the PCM encoder 33 in FIG. 2A has been taken to be of standard design, a reserved code may occasionally appear at its output. Any such code must be either altered or excluded inasmuch as the reserved codes are scheduled to appear only at the dictate of a subcarrier control source which, in FIG. 2A, is the elastic store 32. In the subcarrier transmitter of FIG. 2B any such reserved code is converted into the nearest allowable non-reserved code. Each reserved code R has a stem of seven 1's and is supplemented by two low-order bits to provide four possible codes. Since the stem contains seven 1's, the nearest allowable code in a conventional binary coding format has a stem of six 1's followed by the suffix subgroup 011, making the converted code 111111011.

The conversion is achieved by the action of a delay stage 43 in the converter 42. When enabled by an all 1's stem, an AND gate 41 of the coverter 42 generates an output signal which is delayed by one digit interval during passage through the delay stage 43. By the time that a signal appears at the output of the delay stage 43, the least significant digit signal of the stem, i.e., that corresponding to the seventh 1, has advanced to the output of the next delay stage 6, where it is inhibited by the output of the delay stage 43 at an inhibit gate 45–6. Consequently the input to the fifth delay stage 5 becomes a binary 0 that is in the sixth digit position of the code group that is progressing through the delay stages 1 through 7. Simultaneously with the inhibition of gate 45–6 the output of delay stage 43 appears at OR gates 45–7 and 45–8 so that the eighth and ninth digits of the code word become binary 1's and the resulting progression of signals on the delay stages takes the form of the desired conversion word 111111011.

For detection of each preassigned code P by the subcarrier transmitter of FIG. 2B, taps on the line of delay stages 1 through 7 extend to the detector 45. When a P code occurs, it is either converted into an R code or left unaltered depending on the status of the applied subcarrier signal at an AND gate 46. Since the stem 1010101 of the P code chosen for illustration has zeros in its second, fourth and sixth positions, corresponding taps from the delay line include inverters 47–2, 47–4 and 47–8. The inverters convert a binary 1 into a binary 0 and a binary 0 into a binary 1. Consequently if the P code is detected and if the detector AND gate 46 is enabled by a subcarrier control signal after the delay interval of a delay stage 48, the all 1's stem of the P code appears on the main delay line by virtue of respective OR gates 45–1, 45–3 and 45–5 at the outputs of stages 1, 3 and 5. As a result, the pulse train passing through the delay stages 1 through 7 will contain the all 1's stem since the OR gates in effect substitute 1's for the 0's of the detected P code.

Returning to the transmitting station of FIG. 2A, the PCM output from the subcarrier transmitter enters an elastic store 32 with a capacity of two binary digits. It is of the kind disclosed by M. Karnaugh, U.S. Patent 3,093,815 issued June 11, 1963.

Besides having input and output signal leads, the elastic store 32 has terminals to control the writing and reading time of each entering signal. In addition the elastic store has a write-skip terminal which causes one of its storage cells to be skipped during writing. This is accomplished by pulse insertion. A skip during writing creates an additional or supernumerary pulse signal, which can be either a zero or a one, while a skip during reading deletes a pulse signal. The elastic store also contains a phase comparator for the purpose of indicating the relative timing of the reading and writing signals. There is an output if a bit of information is read within one time slot after it is written; there is no output if more than one time slot separates the reading and writing.

For an elastic store of the kind disclosed by Karnaugh, above, in his FIG. 3, the write-skip terminal of applicant's FIG. 2A is connected to a binary counter 60 in the reference; the write terminal is connected to a pulse shaper 17, which is disconnected from a flywheel circuit 14; the read terminal is connected to a shaper 65; and the phase indication terminal is connected to a difference amplifier 64, as adapted for digital operation by the inclusion of a threshold sensitive, two-state device. In addition, the phase indication output for normal operation is arranged to represent a binary 1, i.e., when the reading and writing rates are substantially alike.

The reading of the elastic store from the distributor 31 is governed from control network 39 by an oscillator 39–1 whose frequency is slightly higher than the minimum necessary to accommodate all of the signals that enter the store. When the store is near depletion, because the reading and writing rates are appreciably out of phase, there is an indication to this effect on the phase indication lead by a change from a binary 1 to a binary 0. This change from a binary 1 to a binary 0 has two effects. First, it removes a control signal from AND gate 46 in the subcarrier transmitter 40 of FIG. 2B so that the R codes that are normally transmitted in place of the P codes are prevented from appearing and the P codes are transmitted in their original, unaltered, form. Second, the change from a binary 1 to a binary 0 releases an inhibit gate 38–1 of the supernumerary control network 38, so that a counter 38–2 can begin counting the number of P codes transmitted on the subcarrier. At a count of three, for reasons considered earlier, a write-skip signal is sent to the elastic store. This has the effect of inserting a supernumerary pulse signal, here a binary 0, into the pulse train and returns the internal phase comparator of the elastic store to its original condition.

Ordinarily, the control oscillator 39–1 need only be fast enough to prevent overflow from the elastic store. At that frequency no supernumerary pulse signals need be inserted. However, where channels are to be added to the system, there is the possibility that one of them will have a higher oscillator frequency. To allow for this possibility the transmitting station oscillator 39–1 is set slightly faster than the minimum anticipated rate. It is regulated by control network components which examine the insertion rate of the supernumerary pulse signals through the action of a low pass filter 39–3, one for each channel, and a network 39–2 for all channels to provide insertion of at least one supernumerary pulse for each million message pulses. Consequently, all channels have a stability of one part in a million.

As shown in FIG. 2A the network 39–2 averages D.C. signal levels derived from low pass filters for the respective J, K and T channels. The network 39–2 may instead operate by selecting the minimum D.C. signal level of the channels J, K and T, in which case it takes the form of an analog AND gate. Such an AND gate has analog signal inputs, and its output, by analogy with a digital AND gate, is at the analog level corresponding to the minimum of its inputs.

Figure 3A:
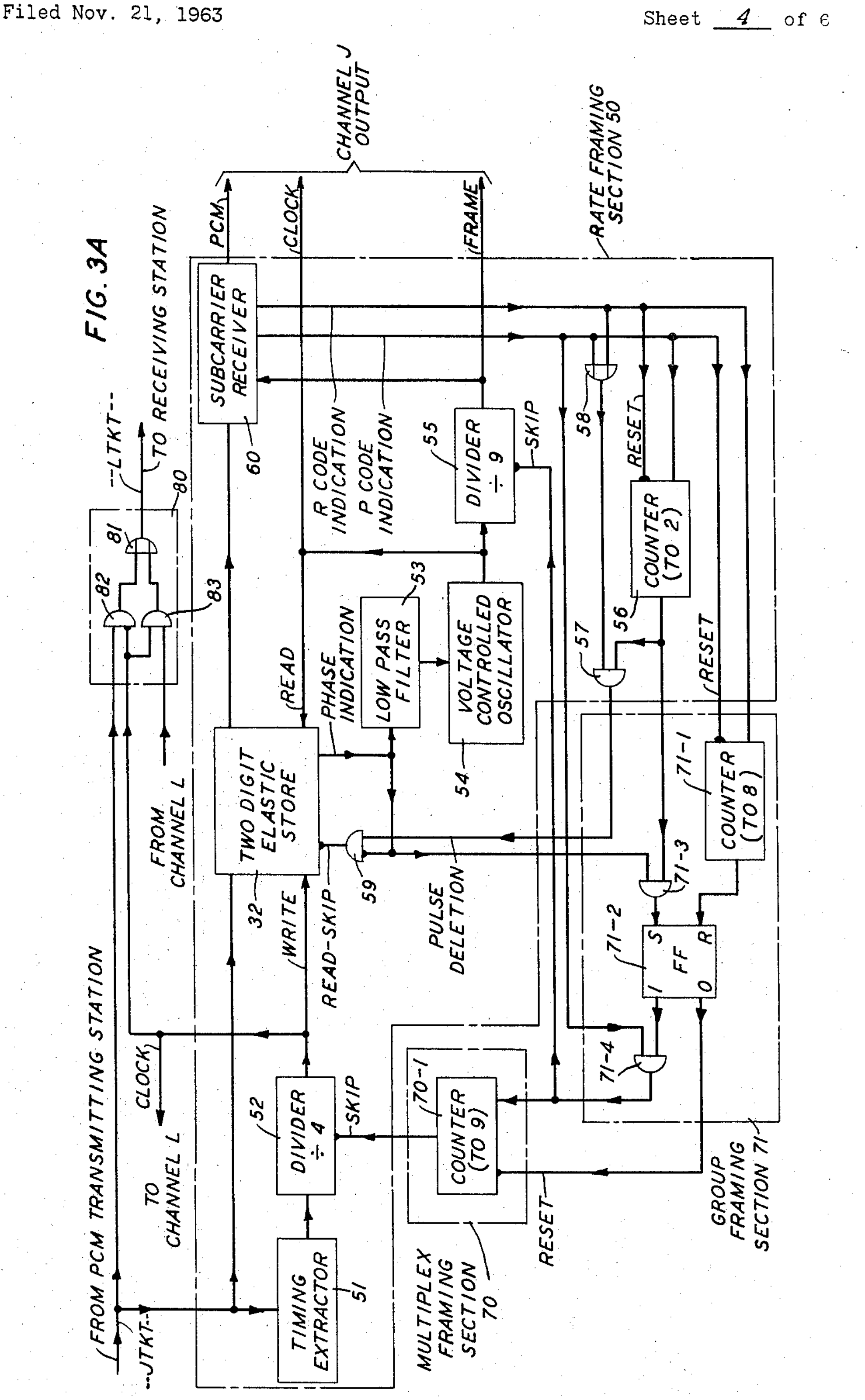
FIG. 3A is a block diagram of a multiplex system intermediate station employed in conjunction with the transmitting station of FIG. 2A.

After being dispatched from the transmitting station of FIG. 2A the pulse code signals, as accompanied by appropriate supernumerary signals, enter the intermediate station of FIG. 3A. There, voice channel J is extracted and voice channel L is substituted in its place. This procedure is conventionally designated "channel dropping and adding."

While channel J is being extracted, it is subjected to rate, multiplex and group framing in separate sections 50, 70 and 71. As will be discussed, the activity of the various sections is dependent upon the phase indication output of the elastic store 32. If no supernumerary pulse signals are detected after monitoring operations are carried out by the rate framing section 50, the reception of P codes is interpreted as an out-of-frame condition. Otherwise a pulse signal is deleted by a read-skip signal in the rate framing section.

At the intermediate station of FIG. 3A, timing signals are extracted from incoming PCM signals by a timing extractor 51 of conventional design. The timing signals, which are at the pulse repetition rate, enter a divider 52 which produces an output on every fourth count in keeping with the ordering — JTKTJTKT — of the channels initially transmitted. The timing extractor is typically an oscillator that is cyclically shocked into excitation at the pulse repetition rate. The divider output provides the writing signal for the elastic store 32. In addition the divider responds selectively to the output of the multiplex framing section by skipping a count of the timing signals when multiplex framing is being undertaken.

Reading of the elastic store is controlled by a signal derived from the phase comparator output of the store by way of a low pass filter 53 and a voltage control oscillator 54. The derived signal is also applied to a divider 55 where it is divided by nine to obtain framing pulse signals for the subcarrier receiver 60. The divider 55 is also controlled from the group framing section 71 to skip counts when group framing is to be undertaken.

Figure 3B:
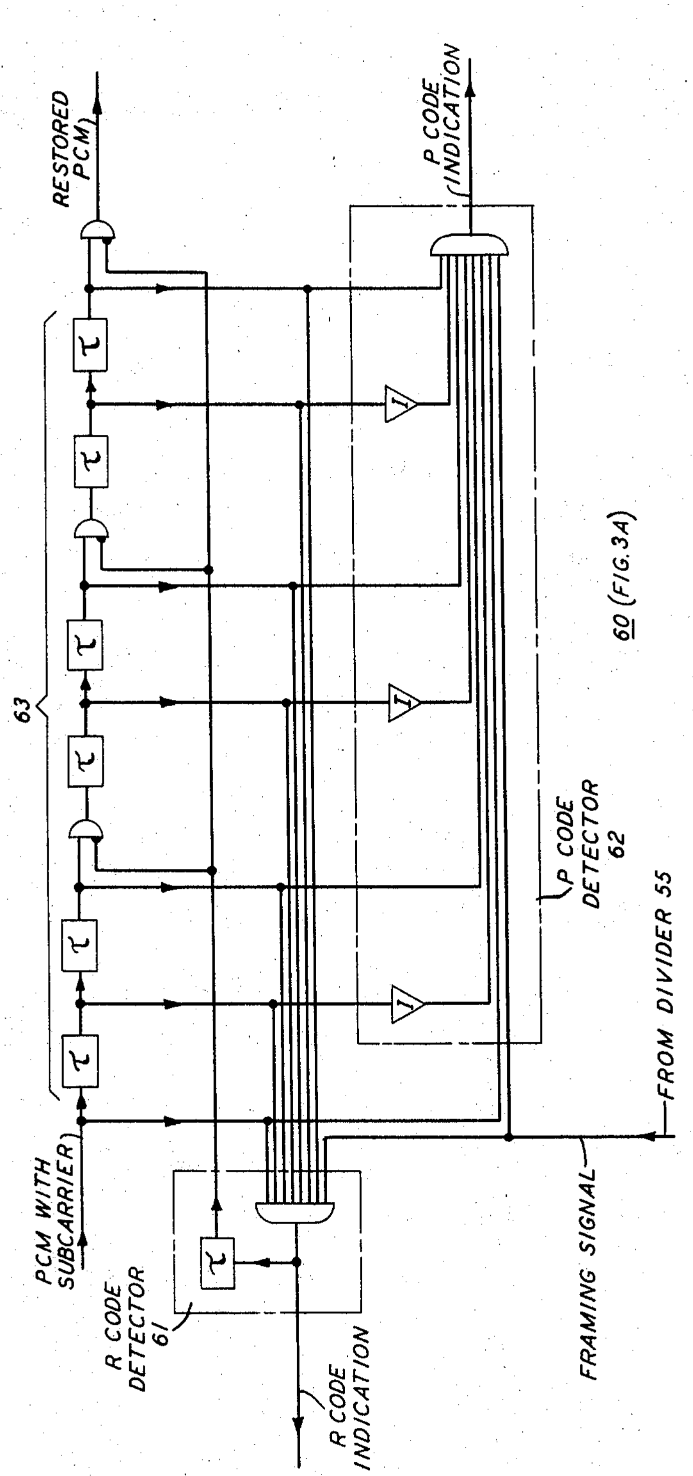
FIG. 3B is a block diagram of a subcarrier receiver for the station of FIG. 3A.

In the subcarrier receiver the subcarrier codes P and R are detected and the pulse code signals restored to their original form by components shown in detail in FIG. 3B. Among these components are two detectors 61 and 62 and a delay line 63 which functions in a fashion similar to that discussed for the subcarrier of FIG. 2B.

Once determined, the R and P subcarrier codes are monitored by first and second counters 56 and 71–1 in FIG. 3A. The first counter 56, with the range of two, detects the occurrences of consecutive P codes. When two consecutive P codes are counted, an output from the counter enables an AND gate 57 to permit the next P or R code response from an OR gate 58 to generate a read-skip signal at a gate 59. The latter deletes a supernumerary pulse signal. However, if the phase indication output of the elastic store is a 1, indicating that the elastic store had recently received a read-skip signal and another such signal is improbable, two consecutive P codes set a flip-flop 71–2 through an AND gate 71–3 to indicate an out-of-frame condition. An ensuing indication at an AND gate 71–4 causes the divider 55 to skip a count and thus adjust its group framing output by one pulse position.

After the out-of-frame condition has been remedied, each occurrence of an R code will advance the group framing counter 71–1 by one unit. After eight such counts the framing flip-flop 71–2 is reset.

Monitoring the group framing section 71 is a counter 70–1 of the multipex framing section 70. If the latter counter completes its nine-count cycle of operation without finding a correct framing condition, incorrect multiplex framing is indicated and the divider 52 at the output of the timing extractor is caused to skip until multiplex framing is restored.

The multiplex framing time is four times that required for group framing because each skip in a multiplex frame requires an entire cycle of group framing.

Substitution of voice channel L in place of the extracted channel J takes place through a switching network 80. In the switching network there is an OR gate 81 and an inhibit gate 82. The latter, as well as channel L proper, is controlled by a timing signal from the divider 52. During the time slots of channel J, the gate 82 is inhibited to prevent the passage of channel J signals to the receiving station, while the channel L signals appear at the OR gate 81 through an AND gate 83.

Figure 4:
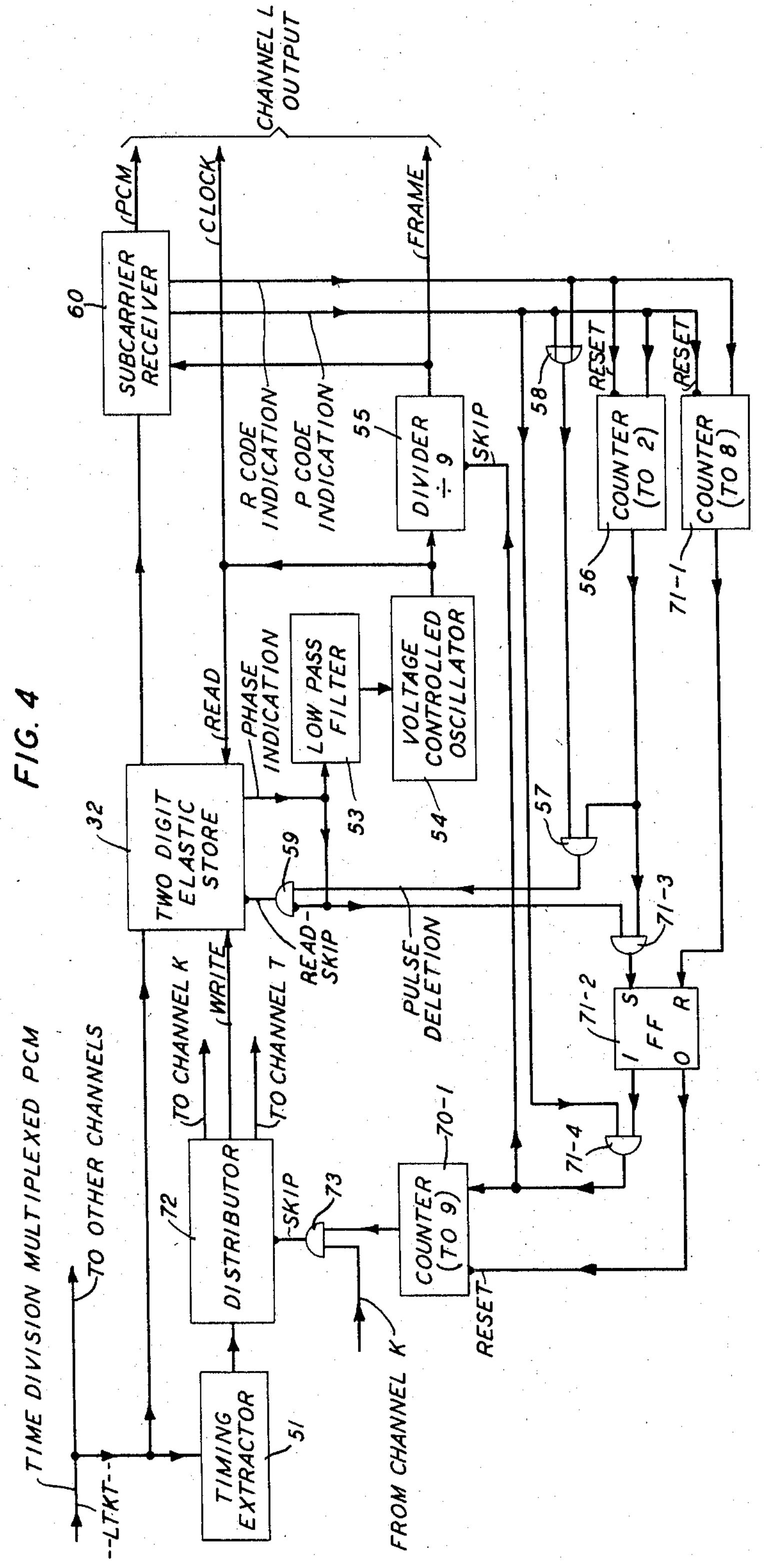
FIG. 4 is a block diagram of a receiving station for a multiplex system employing a subcarrier receiver.

Passing beyond the intermediate station of FIG. 3A the multiplex signals arrive at the receiving station of FIG. 4. The basic components of the receiver station are similar to those used in extracting the channel J at the intermediate station and are similarly labeled. However, a variant is employed in framing the distributor 72. The multiplex framing is assumed to be correct when one of the channels is correctly framed on a group basis. When two of the channels L and K are out-of-frame and one of them has cycled through nine framing positions, the multiplexer, which is a distributor, is caused to skip one position by the response of AND gate 73. At the same time, both of the counters 70–1 and 71–1 are reset to zero and the framing cycle is repeated. The video channel T is not used for multiplex framing because it has twice the pulse rate of the audio channels and it can be in frame even if the multiplex framing is incorrect. When one channel is out-of-frame because of errors, the multiplex framing will not be disturbed. Similarly, when the intermediate station of FIG. 3A is out-of-frame, the added channel L will be in frame and prevent a multiplex disturbance at the receiving station.

Errors in transmission occasionally cause unauthorized pulse detection. Less frequently, a supernumerary pulse signal fails of detection. Nevertheless, since four pairs of subcarrier codes are used in the system of FIGS. 2A through 4, the probable error rate is only about three percent greater than that anticipated without subcarrier transmission. The average group reframing time for the worst out-of-frame condition is less than 0.1 millisecond and multiplex framing is below 0.3 millisecond.

Other adaptations and modifications of the invention will occur to those skilled in the art.

What is claimed is:

1. Apparatus comprising means for generating a coded message wave from which selected code signals are precluded, means for detecting preassigned code signals of said message wave, means for replacing the detected signals by said selected signals under the control of supervisory information to form a composite wave, means for detecting the replacement signals of said composite wave to extract said supervisory information, and means for replacing said replacement signals by counterparts of said preassigned signals to restore said coded message wave.

2. Apparatus comprising means for generating a coded message wave from which selected code signals are excluded, means for detecting presassigned code signals of said message wave, means for replacing the detected signals by said selected signals under the control of supervisory information to form a composite wave, means for detecting the replacement signals of said composite wave to extract said supervisory information, and means for replacing said replacement signals by counterparts of said preassigned signals to restore said coded message wave.

3. Apparatus comprising a first source of information having a plurality of information states, a second source of information having first and second information states, means for generating groups of code signals according to the information of said first source, each of said plurality of information states of said first source except one being represented by a uniquely corresponding group of code signals, means for generating a first, preassigned, group of code signals corresponding to said one information state of said first information source whenever said second information source is in said first information state, and means for generating a second, reserved, group of code signals corresponding to said one information state of said first information source whenever said second information source is in said second information state.

4. Apparatus comprising a transmission path for carrying a plurality of information-bearing groups of code signals, said plurality of groups including a preassigned group and a reserved group, a first information sink having a plurality of information states, a second information sink having first and second information states, first detecting means for detecting the presence of said preassigned group of code signals on said transmission path, means responsive to said first detecting means for placing said first information sink in a given information state and simultaneously placing said second information sink in said first information state, second detecting means for detecting the presence of said reserved group of code signals on said transmission path, and means responsive to said second detecting means for placing said first information sink in said given information state and simultaneously placing said second information sink in said second information state.

5. Apparatus comprising a transmission path, a first information sink having a plurality of information states, a second information sink having first and second information states, first detecting means for detecting a prescribed randomly-occurring permutation of signals on said transmission path representing a code word near the extremity of a code range, means responsive to said first detecting means for directly converting the detected signals into signals representing a code word near the middle of a code range prior to delivery to said first information sink and simultaneously placing said second information sink in said second state, second detecting means for detecting said signals representing a code word near the middle of said code range, means responsive to said second detecting means for placing said second information sink in said first state.

6. Apparatus comprising a transmission path, means for detecting a prescribed randomly-occurring permutation of signals on said transmission path, and means responsive to the detecting means for simultaneously substituting for said prescribed permutation of code signals a permutation of code signals not normally occurring on said transmission path and increasing the number of signals on said transmission path by adding signals to said transmission path.

7. Apparatus comprising transmission path, means for detecting a prescribed randomly-occurring permutation of signals on said transmission path, each of said signals representing a binary "one,"

and means responsive to the detecting means for simultaneously substituting for said prescribed permutation of code signals a permutation of code signals not normally occurring on said transmission path and increasing the number of signals on said transmission path by inserting signals, each representing a binary "one," on said transmission path.

8. Apparatus comprising a transmission path, means for detecting a first prescribed permutation of signals on said transmission path, means for detecting a second prescribed permutation of signals on said transmission path, means responsive to the first mentioned detecting means for converting signals having said first prescribed permutation into signals having said second prescribed permutation, and means responsive to the second mentioned detecting means for converting signals having said second prescribed permutation into signals having a third prescribed permutation.

9. Code apparatus as defined in claim 8 wherein said second mentioned detecting means comprises means for detecting a first set of sequential signals constituting the stem of a code word, and the second mentioned converting means comprises means for partially replacing the stem of said sequential signals by a second set of sequential signals constituting the suffix of said code word.

10. Binary apparatus comprising
a transmission path,
means for detecting a prescribed randomly-occurring permutation of signals on said transmission path, and
means responsive to the detecting means for altering said prescribed permutation and simultaneously deleting at least one signal on said transmission path representing a binary "one."

11. In a system for communicating signals selected from an alphabet of code signals, said alphabet comprising a group of normally-occurring preassigned signals and a group of signals which are normally precluded from appearing at a transmitter output, the method of framing code signals which comprises the steps of:
(1) Detecting a randomly-occurring preassigned group of code signals,
(2) Replacing one of the detected groups of said code signals by a precluded group of code signals, and
(3) Simultaneously supplementing said precluded group of code signals by additional code signals not necessarily selected from said alphabet.

12. The method of claim 11 wherein
a sequential plurality of precluded groups of said code signals precede said supernumerary code signal.

13. Apparatus comprising
means for encoding signals,
means for detecting prescribed permutations of the encoded signals and altering them in response to a comparison signal,
an elastic store including a comparator,
means for entering said encoded signals into said elastic store at a first rate,
means for extracting the stored signals from said elastic store at a second rate, a preassigned difference in the two rates generating said comparison signal,
and means responsive to said comparison signal for entering a supernumerary signal into said elastic store.

14. Apparatus as defined in claim 13, further including means responsive to said comparison signal for controlling the extracting means.

15. Apparatus as defined in claim 13, further including means responsive to the minimum of a plurality of individual comparison signals for controlling the extracting means.

16. Apparatus for the selective extraction of signals being propagated along a transmission path, which comprises
means for deriving timing signals from the propagated signals,
means for indicating selected, periodic occurrences of said timing signals,
means controlled by the indicating means for storing propagated signals during said occurrences,
means for extracting stored signals from the storing means,
means for detecting and altering prescribed permutations of the extracted signals,
means responsive to the detected signals for advancing the extraction of said stored signals,
and means responsive to the advancing means for controlling said indicating means.

17. Apparatus for the selective extraction of signals being propagated along a transmission path, which comprises
means for deriving timing signals from the propagated signals,
means for subdividing said timing signals,
means responsive to the subdividing means for storing selected ones of said propagated signals,
means for extracting the stored signals from the storage means, means for detecting prescribed permutations of the signals thus extracted,
means responsive to the detecting means for indicating a first out-of-frame condition and for controlling said storage means,
means responsive to the first-mentioned indicating means for indicating a second out-of-frame condition,
and means responsive to the second-mentioned indicating means for indicating a third out-of-frame condition and for controlling said subdividing means.

18. Apparatus as defined in claim 17 wherein said first-mentioned indicating means comprises a counter interconnecting said detecting means with said storage means.

19. Apparatus as defined in claim 17 wherein said second-mentioned indicating means comprises
a two-state device connected to said third-mentioned indicating means,
and a counter interconnecting said two-state device with said second-mentioned indicating means.

20. Apparatus as defined in claim 17 wherein said third-mentioned indicating means comprises a counter interconnecting said second-mentioned indicating means with said subdividing means.

21. Apparatus for demultiplexing propagated pulse signals which comprises
means for deriving timing signals from the propagated pulse signals,
a multiplexer responsive to said timing signals,
means for storing selected ones of the propagated pulse signals under the control of said multiplexer,
means for detecting prescribed permutations of the stored signals,
means responsive to the detecting means for indicating an out-of-frame condition,
and means responsive to the indicating means for controlling said multiplexer.

22. Apparatus as defined in claim 21 wherein the controlling means comprises
means responsive to a plurality of indicating means for controlling said multiplexer.

23. A transmitting station for a multiplex system employing a subcarrier transmitter, which comprises
a subcarrier transmitter having an input, an output, a framing terminal, an indicator terminal, and a control terminal,
an encoder connected to said input,
a divider connected to said encoder and to the framing terminal of said subcarrier transmitter,
an elastic store having an input terminal, an output terminal, a write terminal, a read terminal, a phase comparison terminal, and a write-skip terminal, the input and phase comparison terminals of said elastic store being connected to the output and control terminals respectively of said subcarrier transmitter,
a clock signal source connected to said divider and to the write terminal of said elastic store,
an inhibit gate having an inhibit terminal connected to the phase comparson terminal of said elastic store, an input terminal connected to the indicator terminal of said subcarrier transmitter and an output terminal,
a low pass filter,
a counter interconnecting the output terminal of said inhibit gate with the write-skip terminal of said elastic store and with said low pass filter,
a voltage-controlled oscillator,
a control network interconnecting said low pass filter with said voltage-controlled oscillator,
and a multiplexer interconnecting said voltage-controlled oscillator with the read terminal of said elastic store.

24. An intermediate station for a multiplex transmission system which comprises
an elastic store having an input, an output, a write terminal, a read terminal, a phase comparison terminal and a read-skip terminal, a timing extractor connected to said input,
a divider interconnecting said timing extractor with said write terminal,
a voltage-controlled oscillator connected to said read terminal,
a low pass filter interconnecting said phase comparison terminal with said voltage-controlled oscillator,
a subcarrier receiver connected to said output and having an output terminal, a first code terminal, a second code terminal and a control terminal,
a divider interconnecting said voltage-controlled oscillator with the control terminal of said subcarrier receiver,
a counter connected to the first code terminal of said subcarrier receiver,
a first AND gate activated by said first counter and the first and second code terminals of said subcarrier receiver,
an inhibit gate connected to the read-skip terminal of said elastic store and activated from said phase comparision terminal and said first AND gate,
a two-state device,
a second AND gate connected to said two-state device and activated from the phase comparison terminal of said elastic store and said first counter,
a second counter interconnecting said two-state device with the first code terminal of said subcarrier receiver,
a third counter connected to said divider,
and a third AND gate interconnecting the second code terminal of said subcarrier receiver and said two-state device with said third counter.

25. A receiving station for a multiplex system employing a subcarrier receiver which comprises
an elastic store having an input, an output, a write terminal, a read terminal, a read-skip terminal and a phase comparison terminal,
a timing extractor connected to said input,
a multiplexer having a plurality of output terminals, one of which is connected to the write terminal of said elastic store,
said multiplexer also having an input terminal connected to said timing extractor and a control terminal,
a subcarrier receiver having an input terminal connected to the output of said elastic store, an output terminal, a first code terminal, a second code terminal and a control terminal,
a voltage-controlled oscillator connected to the read terminal of said elastic store,
a low pass filter interconnecting the phase comparison terminal of said elastic store with said voltage-controlled oscillator,
a divider connecting said voltage-controlled oscillator with the control terminal of said subcarrier receiver,
first and second counters connected to the first code terminal of said subcarrier receiver,
a first AND gate activated jointly by the first counter and from the first and second code terminals of said subcarrier receiver,
an inhibit gate connected to the read-skip terminal of said elastic store and activated jointly from said first AND gate and the phase comparison terminal of said elastic store,
a bistate device connected to the second counter,
a second AND gate connected to said second counter and activated jointly from said first counter and the phase comparison terminal of said elastic store,
a third counter,
a third AND gate connected to said third counter and activated jointly from said bistate device and the second code terminal of said subcarrier receiver,
and a fourth AND gate connected to the skip terminal of said multiplexer and activated from said third counter and another similar to it.

References Cited

UNITED STATES PATENTS

| | | | |
|---|---|---|---|
| 3,226,482 | 12/1965 | Wright | 179—15 |
| 3,201,777 | 8/1965 | Brown | 179—15 |
| 3,083,267 | 3/1963 | Weller | 179—15 |
| 2,912,508 | 11/1959 | Hughes | 179—15 |

RALPH D. BLAKESLEE, *Primary Examiner.*

U.S. Cl. X.R.

325—38, 41